United States Patent
Tsai et al.

(10) Patent No.: US 9,215,474 B2
(45) Date of Patent: Dec. 15, 2015

(54) BLOCK-BASED MOTION ESTIMATION METHOD

(75) Inventors: Sam Shang-hsuan Tsai, Hsin-Chu (TW); Chao-Chih Huang, Tai-Chung Hsien (TW); Kai-Hsiang Chou, Hsin-Chu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 2765 days.

(21) Appl. No.: 11/161,049

(22) Filed: Jul. 21, 2005

(65) Prior Publication Data

US 2006/0018554 A1 Jan. 26, 2006

(30) Foreign Application Priority Data

Jul. 21, 2004 (TW) .............................. 093121815 A

(51) Int. Cl.
- *H04N 19/533* (2014.01)
- *H04N 19/56* (2014.01)
- *H04N 19/61* (2014.01)

(52) U.S. Cl.
CPC ............. *H04N 19/533* (2014.11); *H04N 19/56* (2014.11); *H04N 19/61* (2014.11)

(58) Field of Classification Search
CPC ...... H04N 19/533; H04N 19/56; H04N 19/61
USPC .................................................. 375/240.16
See application file for complete search history.

(56) References Cited

U.S. PATENT DOCUMENTS

| 6,222,883 | B1 | 4/2001 | Murdock et al. |
| 6,563,874 | B1 | 5/2003 | Lu |
| 6,668,020 | B2 | 12/2003 | Ma et al. |
| 6,968,009 | B1 * | 11/2005 | Straasheijm ............. 375/240.16 |
| 2002/0114394 | A1 | 8/2002 | Ma |
| 2004/0028133 | A1 * | 2/2004 | Subramaniyan et al. 375/240.16 |
| 2004/0247029 | A1 * | 12/2004 | Zhong et al. ............. 375/240.16 |

OTHER PUBLICATIONS

P.I. Hosur, K.K. Ma, "Motion Vector Field Adaptive Fast Motion Estimation.", Jul. 21, 1995, Singapore.

(Continued)

*Primary Examiner* — Anner Holder
(74) *Attorney, Agent, or Firm* — McClure, Qualey & Rodack, LLP

(57) ABSTRACT

A motion estimation method for determining a resultant motion vector. The motion estimation method includes: performing a first searching operation starting from an initial motion vector to determine an intermediate motion vector, wherein the first searching operation is performed according to a first searching principle; and performing a second searching operation starting from the intermediate motion vector, to determine the resultant motion vector, wherein the second searching operation is performed according to a second searching principle. The first searching operation is a rough search, while the second searching operation is a fine search.

13 Claims, 7 Drawing Sheets

(56) References Cited

OTHER PUBLICATIONS

"Information technology—Coding of audio-visual objects—Part 7: Optimised reference software for coding of audio-visual objects.", Optimised Reference Software for Codingof audio-visual objects., Dec. 2001, pp. 1-14, vol. 4.0, International Organization for Standardisation. Pattaya.

[L. Liu, E. Feig., "A Block-Based Gradient Descent Search Algorithm for Block Motion Estimation in Video Coding.", IEEE Trans. on Circuits and Systems for Video Technology., Aug. 1996, pp. 419-422. vol. 6, No. 4, 1998 IEEE.

Y. Nie, K.K. Ma., "Adaptive Rood Pattern Search for Fast Block-Matching Motion Estimation.", IEEE Trans. on Image Processing., Dec. 2002, pp. 1442-1449, vol. 11, No. 12, 2002 IEEE.

\* cited by examiner

BLOCK-BASED MOTION ESTIMATION METHOD

BACKGROUND OF THE INVENTION

1. Field of the Invention

The invention relates to a motion estimation method, and more particularly to a motion estimation method which utilizes blocks of two frames to determine a motion vector of a block.

2. Description of the Prior Art

During processing video data, a coding method is usually utilized for compressing video data amount. Standards of video processing often comprise several coding methods for satisfying all kinds of coding demands. For example, MPEG-2 (moving picture coding experts group-2) standard is a coding method for suppressing the redundant video information in time domain or in space domain.

In order to suppress the above-mentioned redundant information, a video compressing technique such as a motion compensation technique is usually used. The steps carried out before using the motion compensation technique comprise: dividing a frame into many blocks (known as 'macroblocks'), which respectively comprise a specific number of pixels; selecting a block among the macroblocks as a target block; searching a reference block similar to the target block from a reference frame; and determining a motion vector according to the positions of the target block and the reference block.

Many methods have been proposed for determining motion vectors, these methods including: L. Liu, E. Feig, "A block-based gradient descent search algorithm for block motion estimation in video coding," (IEEE Trans. on Circuits and Systems for Video Technology, vol. 6, no. 4, pp. 419-422); P. I. Hosur, K. K. Ma, "Motion vector field adaptive fast motion estimation," (Second International Conference on Information Communication and Signal Processing, Singapore, 7-10 Dec. 99); and Y. Nie, K. K. Ma, "Adaptive rood pattern search for fast block-matching motion estimation," (IEEE Trans. on Image Processing, vol. 11, no. 12, pp. 1442-1449, December 2). However, these and other know methods in this art still suffer problems of memory consumption and low efficiency. Consequently, improved methods and systems are still desired.

SUMMARY OF THE INVENTION

It is therefore an objective of the claimed invention to provide a motion estimation method for solving the above-mentioned problems.

According to a preferred embodiment of the claimed invention, a motion estimation method is disclosed for determining a resultant motion vector. The motion estimation method comprises: using an initial motion vector for executing a first searching operation according to a first searching principle, so as to determine an intermediate motion vector; and using the intermediate motion vector for executing a second searching operation according to a second searching principle, so as to determine the resultant motion vector.

According to another embodiment of the present invention, a motion estimation method for determining a first motion vector is disclosed. The motion estimation method comprises: selecting one of two searching directions as an initial searching direction; executing a searching operation on a plurality of blocks in the initial searching direction to determine a first block; executing the searching operation on a plurality of blocks in the unselected direction to determine a second block; and, if the first block and the second block correspond to the same block, set a motion vector of this block as the first motion vector.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
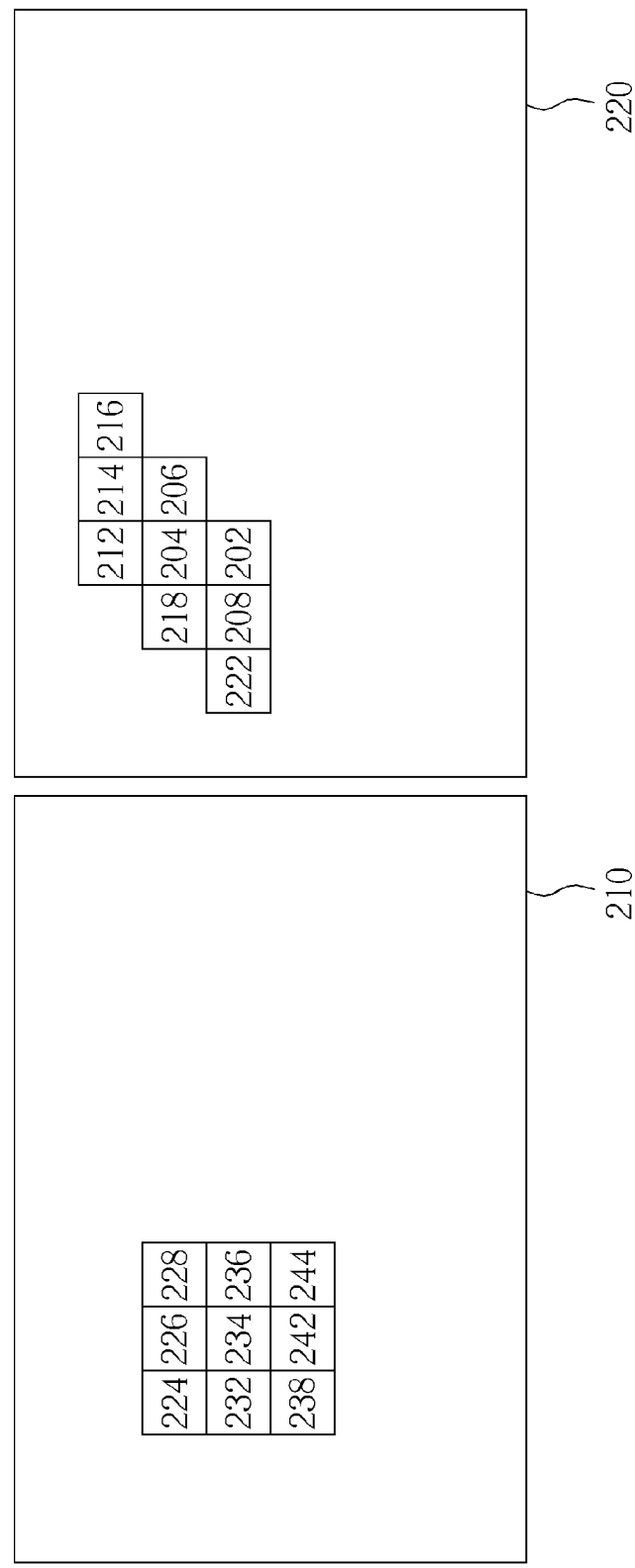
FIG. 1 is a diagram showing a current block processed by a motion estimation method according to the present invention.

Please refer to FIG. 1, which is a diagram showing a current block processed by a motion estimation method according to the present invention. The current frame 220 comprises a current block 202, surrounding blocks 204, 206, and 208 (these being the top block T, the top-right block TR, and left block L), and other blocks 212, 214, 216, 218, and 222. Similarly, the reference frame 210 comprises a previous block 234 corresponding to the current block 202 and the other blocks 224, 226, 228, 232, 236, 238, 242 and 244. In this embodiment, sizes of all blocks are 8 pixels*8 pixels such that each block is square and composed of 64 pixels. Please note that, the block size is not limited as the above-mentioned 8*8 pixels. In fact, other size, such as 16 pixels*16 pixels, can also be used to calculate the motion vector. As shown in FIG. 1, the previous block 234 in the reference frame 210 will be displayed in the same place of a display screen as the current block 202 of the current frame 220 will be displayed.

Figure 2:
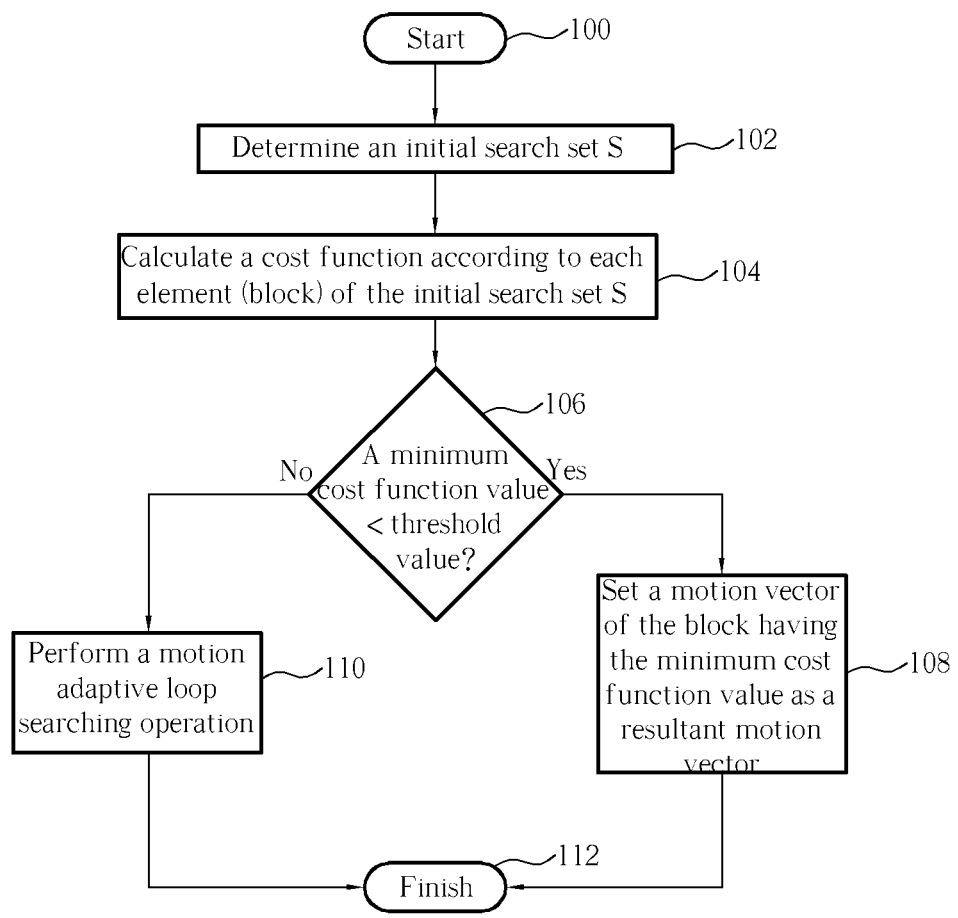
FIG. 2 is a flow chart of the motion estimation method according to the present invention.

Please refer to FIG. 2, which is a flow chart of the motion estimation method according to the present invention. In this embodiment, the searching operation of the motion estimation method for determining a motion vector with respect to the current block 202 comprises the following steps:

Step 100: Start a motion estimation operation.

Step 102: Determine an initial search set S. In this embodiment, the initial search set S comprises motion vectors of the current block 202 and a plurality of surrounding blocks 204, 206, 208, 234 around the current block 202. In other embodiments, the initial search set can comprise motion vectors of blocks, which are different from that of the present embodiment.

Step 104: Calculate a cost function according to each element of the initial search set S. In this embodiment, the cost function is achieved by a sum of absolute differences (SAD). However, those skilled in the art can appreciate that the cost function may be achieved by other ways.

Step 106: Compare a minimum cost function value among all cost function values obtained by calculating the cost function in step 104 with a first threshold value. If the minimum cost function value is less than the first threshold value, go to step 108; otherwise, go to step 110. In this embodiment, the first threshold value is determined according to previous searched data. Here, the first threshold value is determined according to a minimum cost function value among the cost function values of the previous block 234 and its surrounding blocks 224-244. In other embodiments, the first threshold value can be determined through other principles.

Step 108: Set the motion vector of the block having the minimum cost function value as a resultant motion vector.

Step 110: Perform a motion adaptive loop searching operation, wherein the motion adaptive loop searching operation will be further illustrated in the following description of FIG. 3.

Step 112: Complete the motion estimation operation.

Figure 3:
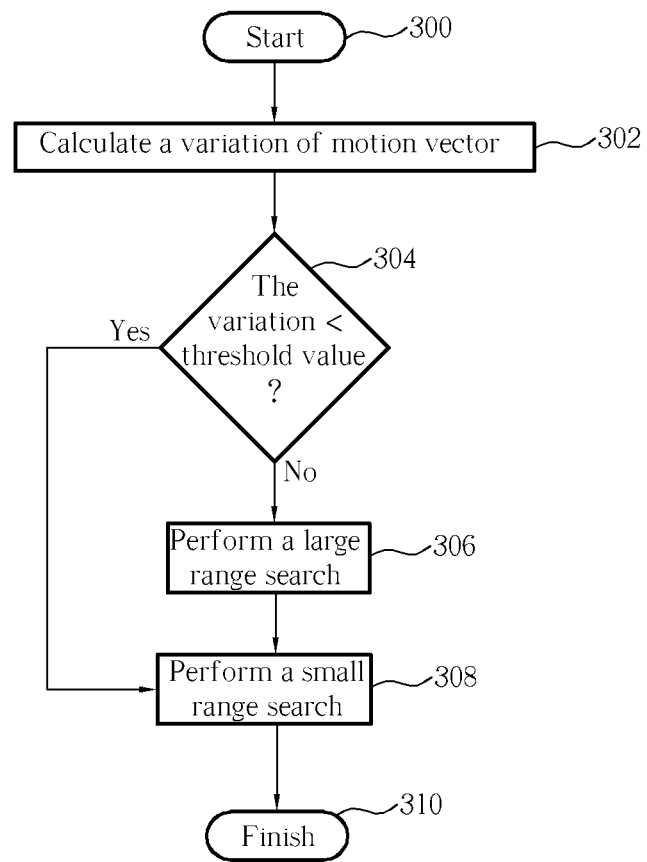
FIG. 3 is a flow chart of a motion adaptive loop search according to the present invention.

Please refer to FIG. 3, which is a flow chart of the above-mentioned motion adaptive loop searching operation according to the present invention. The adaptive loop searching operation, which corresponds to the step 110 shown in FIG. 2, comprises the following steps:

Step 300: Start the motion adaptive loop searching operation.

Step 302: Calculate a variation of motion vectors, which represents the whole difference between motion vectors of the surrounding blocks 204, 206, 208 around the current block 202 Assuming that the motion vector of the top block 204 is represented as $(MV_{XT}, MV_{YT})$, the motion vector of the top-right block 206 is represented as $(MV_{XTR}, MV_{YTR})$, and the motion vector of the left block 208 is represented as $(MV_{XL}, MV_{YL})$, the variation is calculated through but not limited to the following equations:

$$medMV_X = \text{median}(MV_{XT}, MV_{XTR}, MV_{XL}) \quad (1)$$

$$medMV_Y = \text{median}(MV_{YT}, MV_{YTR}, MV_{YL}) \quad (2)$$

$$varMV_X = \sum_{K=T,TR,L} [MV_{XK} - medMV_X] \quad (3)$$

$$varMV_Y = \sum_{K=T,TR,L} [MV_{YK} - medMV_Y] \quad (4)$$

$$\text{variation} = varMV_X + varMV_Y \quad (5)$$

In the above equations, medMVx and medMVy are medians of the surrounding blocks 204, 206, and 208 in X and Y directions, respectively; varMVx and varMVy are variances of the surrounding blocks 204, 206, and 208 in X and Y directions, respectively. Furthermore, the variation of equation (5) is the sum of the variances varMVx and varMVy. Please note that the variation can be other arithmetic results in accordance with the variance varMVx and varMVy in other embodiments.

Step 304: Compare the above-mentioned variation with a second threshold value. If the variation is less than the second threshold value, go to step 308, otherwise go to step 306. In this embodiment, if the variation is calculated through a normalization operation, the second threshold value can be set as 1. However, the second threshold value can be set as other values according to the practical application.

Step 306: Perform a large range search, which is a rough search, for more quickly decreasing the searching range. The detailed illustration of the large range search will be illustrated in the following description of FIG. 4.

Step 308: Perform a small range search, which is a fine search, for determining the resultant motion vector. The detailed illustration of the small range search will be illustrated in the following description of FIG. 5.

Step 310: Complete the motion adaptive loop search.

The step 304 represents that if the variation obtained in step 302 is less than the second threshold value, only the small range search needs to be performed such that the resultant motion vector can be obtained without executing the large range search, otherwise, the large range search is first performed to approach the resultant motion vector and then a small range search is performed to determine the resultant motion vector.

Figure 4:
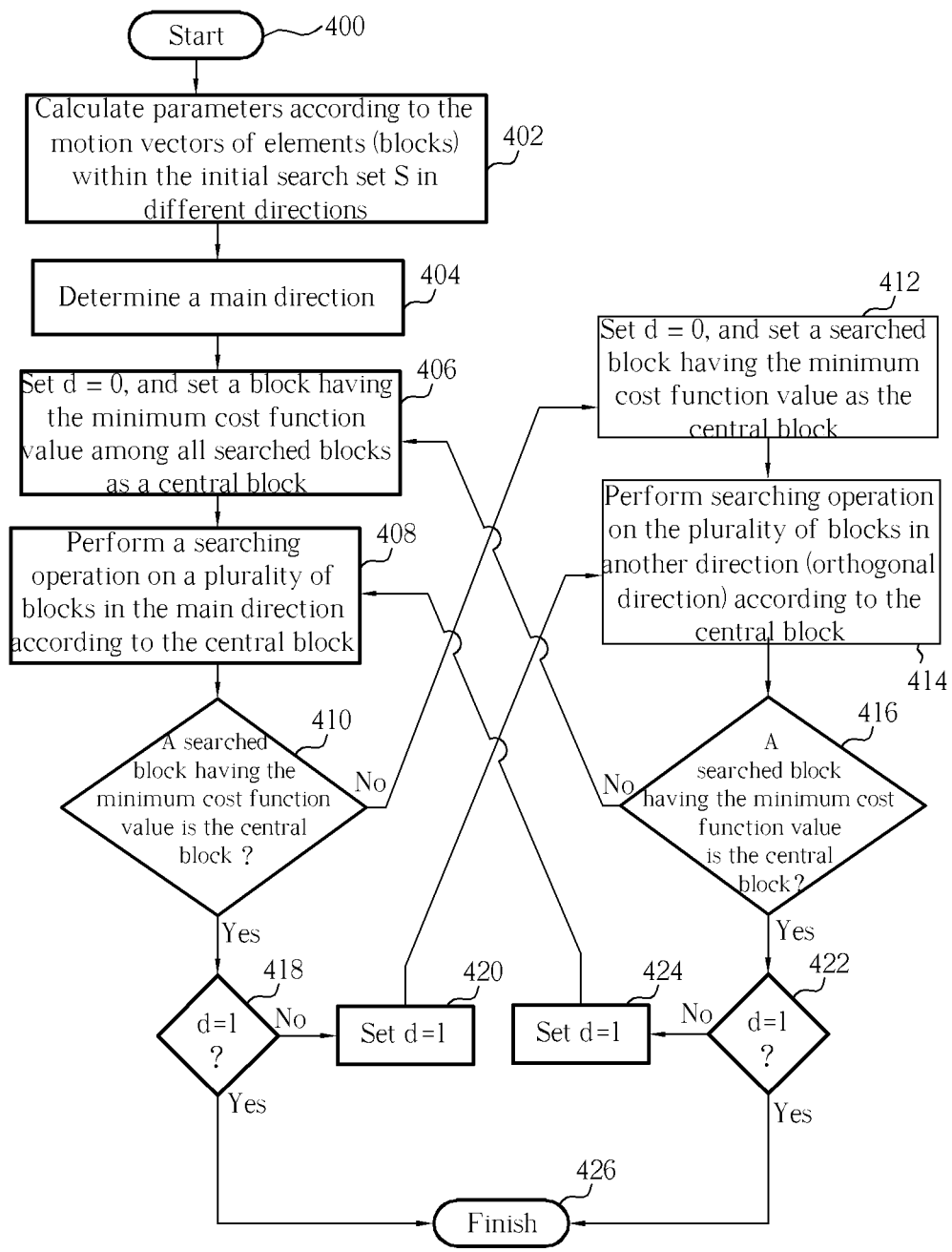
FIG. 4 is a flow chart of a large range search according to the present invention.

Please refer to FIG. 4, which is a flow chart of the large range search of an embodiment according to the present invention. The flow, corresponding to the step 306 shown in FIG. 3, comprises following steps:

Step 400: Start the large range search.

Step 402: Calculate the parameters according to the motion vectors of elements within the initial search set S in different directions In this embodiment, the parameters are respectively obtained according to the motion vectors in X direction and Y direction. The parameters can be represented by the variances obtained in equations (3) & (4).

Step 404: Determine a main direction. In this embodiment, the main direction is determined by comparing the parameters corresponding to the X and Y directions obtained in step 402. If the parameters corresponding to X direction is larger than that corresponding to Y direction, the main direction is set as the X direction, otherwise the main direction is set as the Y direction.

Step 406: Set a parameter d=0, and set a block having the minimum cost function value among all searched blocks as a central block Step 408: Perform a searching operation on a plurality of blocks in the main direction according to the central block used as a central point, and calculate the cost function values with respect to the plurality of blocks. Please note that, in this embodiment, the searching operation is performed on the plurality of blocks along a straight line in the main direction. The plurality of blocks can be continuous or discontinuous. The discontinuous blocks may have a fixed interval between every two of the blocks. Besides, the searching operation can be performed on blocks corresponding to different straight lines.

Step 410: If a block searched in step 408 has the minimum cost function value, that is to say, this block is the central block, then go to step 418, otherwise go to step 412.

Step 412: Set the parameter d=0, and set a searched block having the minimum cost function value as the central block.

Step 414: Perform searching operation on the plurality of blocks in another direction (orthogonal direction) according to the central block used as a central point, and calculate the cost function values with respect to the plurality of blocks. Please note that, in this embodiment, the plurality of blocks can be continuous or discontinuous. The discontinuous blocks may have a fixed interval between every two of the blocks. Besides, the searching operation can be performed on blocks corresponding to different straight lines.

Step 416: If a block searched in step 408 has the minimum cost function value, that is to say, this block is the central block, then go to step 422, otherwise go to step 406.

Step 418: If the parameter d=1, go to step 426, otherwise, go to step 420.

Step 420: Set the parameter d=1, go back to step 414.

Step 422: If the parameter d=1, go to step 426; otherwise, go to step 424.

Step 424: Set the parameter d=1, go back to step 408.

Step 426: Complete the large range search.

The above-mentioned process flow from step 406 to step 424 is further illustrated as follows. After a main direction is determined in step 404, first, the searching operation is performed in the main direction to find out the block having the minimum cost function value. And then, the block having the minimum cost function value is used as a central block, and the same searching operation is performed in another direction. The above-mentioned searching operations in two directions are continuously performed alternatively until the blocks having the minimum cost function value in different directions corresponds to the same central block.

Figure 5:
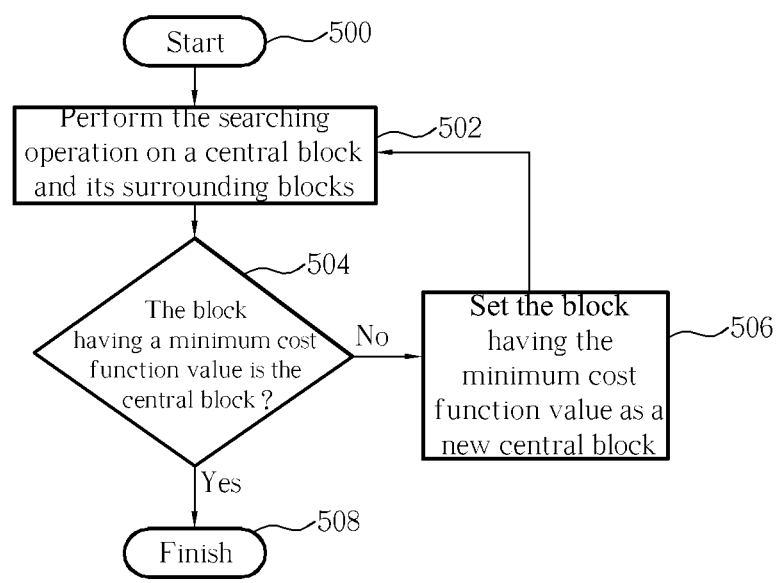
FIG. 5 is a flow chart of a small range search according to the present invention.

Please refer to FIG. 5, which is a flow chart of a small range search according to the present invention. In this embodiment, the flow corresponds to the step 308 in FIG. 3 and comprises following steps:

Step 500: Start the small range search.

Step 502: Perform the searching operation on a central block and its surrounding blocks and calculate the cost function; please note that the small range search is performed on the central block and surrounding blocks (or neighboring blocks). Furthermore, the searching operation can be performed through utilizing a large diamond search pattern, a small diamond search pattern, or other patterns. The detailed illustration of utilizing the large diamond pattern and the small diamond search pattern can be referred to in the international organization for standardization technical report ISO/IEC DTR 14496-7, "Information technology—Coding of audio-visual objects—Part 7: Optimised reference software for coding of audio-visual objects".

Step 504: Compare the cost function values calculated in step 502, if the block having the minimum cost function value is the central block, go to step 508, otherwise, go to step 506.

Step 506: Set the block having the minimum cost function value as a new central block, and go to step 502 again.

Step 508: Complete the small range search.

Figure 6:
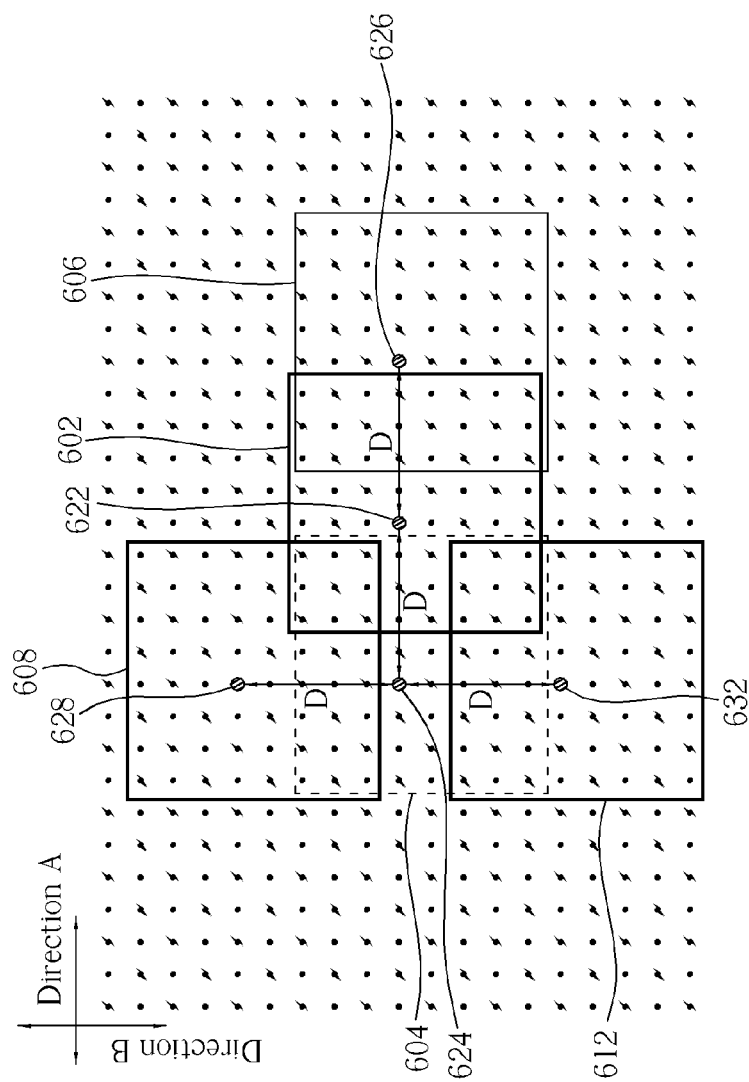
FIG. 6 is a diagram of executing a large range search according to the motion estimation method of the present invention.
Figure 7:
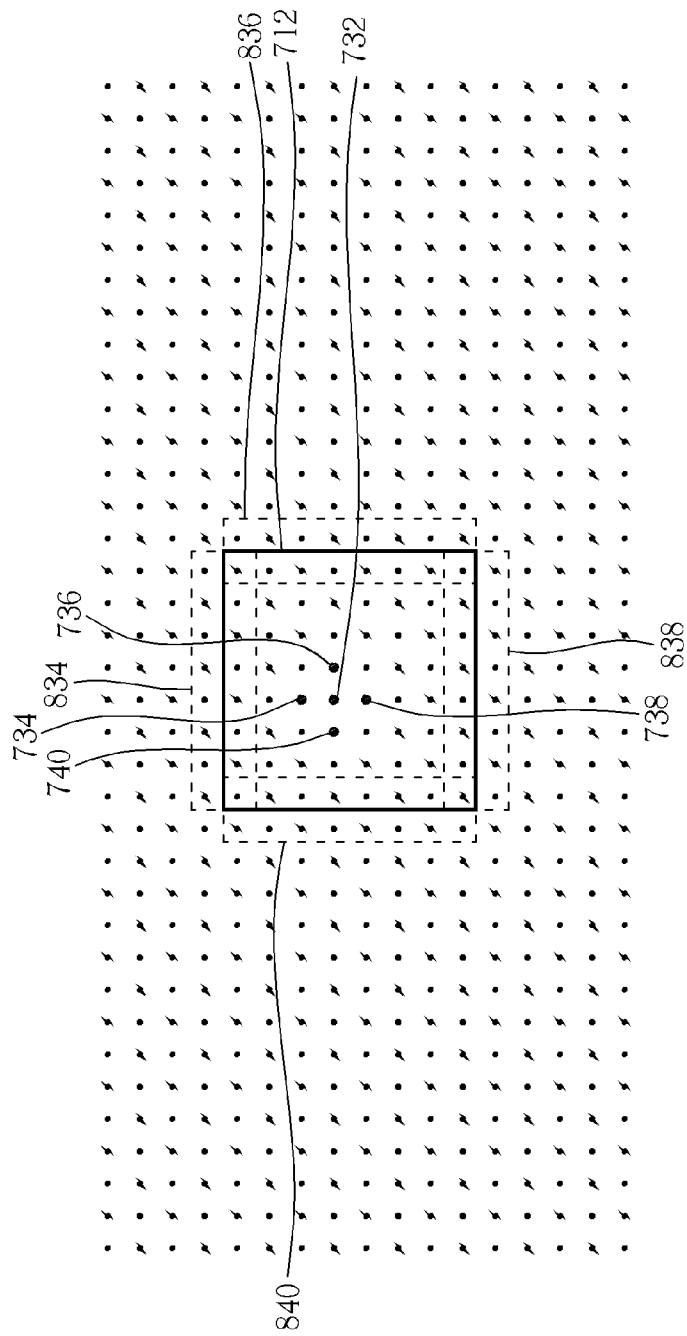
FIG. 7 is a diagram of executing a small range search according to the motion estimation method of the present invention.

Please refer to FIG. 6 in conjunction with FIG. 7. FIG. 6 is a diagram illustrating a large range search according to the present invention. FIG. 7 is a diagram illustrating a small range search according to the present invention. In FIG. 6, the block 602 is assumed as the central block when execution of the large range search starts, and the main direction in step 404 is determined as the A direction. Then, in step 408, the searching operation is performed on blocks 602, 604, and 606 according to the central block 602 used as a center point in the A direction. Here, if the block having the minimum cost function value is the block 604 in step 410, the block 604 is set as a new central block. Therefore, the searching operation is performed on blocks 604, 608, and 612 according to the new central block 604 in step 414 and following steps. And then, the above steps being repeated until the above-mentioned condition is met (the blocks having the minimum cost function value in two directions are the same block). In this embodiment, the interval D between the blocks in a certain direction is 5 pixels.

In FIG. 7, the block 712 is assumed as a central block when execution of the small range searching operation starts. In step 502, the searching operation is performed on the central block 712 and its neighboring blocks 834, 836, 838, and 848 according to a certain pattern (such as the small diamond pattern shown in FIG. 7). Additionally, the central block is updated and the above steps are repeated until the above-mentioned condition is met.

Please note that, the above-mentioned method is only utilized as an embodiment, not a limitation of the present invention. That is, the present invention does not limit such factors as the interval D between two blocks, the pattern used in the small range search, and the space distribution of directions A and B. For example, the directions A and B can correspond to two orthogonal sloping lines.

The present invention motion estimation method first has to determine whether the large range search and the small range search need to be performed to determine the motion vector of a current block. If the motion vector of the current block cannot net be directly set according to a known motion vector, the large range search is first performed to quickly obtain a block near the current block, and then the small range block is subsequently performed for accurately selecting the searched block near the current block, and finally, the motion vector of the current block is calculated according to the space distribution of the selected searched block and the current block. The above-mentioned motion estimation method can greatly shorten the searching operation and quickly identify the motion vector. Therefore, the efficiency of compressing video data is further raised.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A motion estimation method for determining a resultant motion vector, the motion estimation method comprising:

using an initial motion vector for performing a first searching operation according to a first searching principle, so as to determine an intermediate motion vector by a video processor, wherein the first searching operation is performed when a variation of motion vectors surrounding a current block is more than a predefined threshold, the first operation being performed by: (1) determining a main direction; (2) searching in the main direction according to a central block to determine a block having a minimum cost function value; (3) using the block having the minimum cost function value as the central block; and (4) searching in a direction orthogonal to the main direction according to the central block obtained in step (3) to determine a block having the minimum cost function value; and using the intermediate motion vector for performing a second searching operation according to a second searching principle, so as to determine the resultant motion vector by the video processor.

2. The motion estimation method of claim 1, wherein the first searching operation is a rough search.

3. The motion estimation method of claim 1, wherein the first searching principle comprises:

selecting one of two searching directions as an initial searching direction for the first searching operation.

4. The motion estimation method of claim 3, wherein the two searching directions are orthogonal.

5. The motion estimation method of claim 3, wherein the first searching principle comprises:

performing the first searching operation according to each of the two searching directions alternately.

6. The motion estimation method of claim 1, wherein the second searching operation is a fine search.

7. The motion estimation method of claim 1, wherein the second searching principle comprises:

performing the second searching operation according to a predetermined pattern.

8. The motion estimation method of claim 7, wherein the predetermined pattern is a small diamond pattern.

9. The motion estimation method of claim 7, wherein the predetermined pattern is a large diamond pattern.

10. A motion estimation method for determining a first motion vector, the motion estimation method comprising:
    selecting, by a video processor, a main direction as an initial searching direction;
    when a variation of motion vectors surrounding a current block is more than a predefined threshold, performing, by the video processor, a first searching operation on a plurality of blocks according to the initial searching direction with respect to a central block, so as to determine a first block having a minimum cost function value;
    using the block having the minimum cost function value as the central block and performing, by the video processor, a second searching operation on a plurality of blocks in a second direction according to the central block that is orthogonal to the main direction, so as to determine a second block having a minimum cost function value in the second direction; and
    if the first block and the second block correspond to an identical block, setting, by the video processor, a motion vector corresponding to the identical block as the first motion vector.

11. The motion estimation method of claim 10, wherein at least one of the first and second searching operation comprises:
    calculating a cost function value according to each searched block.

12. The motion estimation method of claim 11, wherein the cost function value is a sum of absolute differences.

13. The motion estimation method of claim 10, wherein the main direction is determined according to a variance value corresponding to a plurality of motion vectors.

* * * * *